(12) United States Patent
Judge et al.

(10) Patent No.: US 9,727,865 B2
(45) Date of Patent: Aug. 8, 2017

(54) AUTOMATIC DATA TRANSFER

(71) Applicant: MasterCard International Incorporated, Purchase, NY (US)

(72) Inventors: Edward W. Judge, Hampshire (GB); Anouska Ladds, Caterham (GB); Michael J. Cowen, London (GB); James C. Noe, Kent (GB)

(73) Assignee: Mastercard International Incorporated Purchase, NY (US)

( * ) Notice: Subject to any disclaimer, the term of this patent is extended or adjusted under 35 U.S.C. 154(b) by 0 days.

(21) Appl. No.: 14/661,658

(22) Filed: Mar. 18, 2015

(65) Prior Publication Data

US 2015/0269572 A1 Sep. 24, 2015

(30) Foreign Application Priority Data

Mar. 19, 2014 (GB) .................................. 1404907.6

(51) Int. Cl.
| | | |
|---|---|---|
| *G06Q 20/40* | (2012.01) | |
| *G06Q 20/32* | (2012.01) | |
| *G06Q 40/00* | (2012.01) | |
| *G07B 15/00* | (2011.01) | |
| *G07C 9/00* | (2006.01) | |

(52) U.S. Cl.
CPC ........... *G06Q 20/40* (2013.01); *G06Q 20/327* (2013.01); *G06Q 20/3226* (2013.01); *G06Q 20/3278* (2013.01); *G06Q 20/405* (2013.01); *G06Q 20/4037* (2013.01); *G06Q 20/4093* (2013.01); *G06Q 2240/00* (2013.04); *G07B 15/00* (2013.01); *G07C 9/00007* (2013.01)

(58) Field of Classification Search
CPC ........ G06Q 20/40; G06Q 20/32; G06Q 40/00; G06Q 40/02; G06Q 20/10; G06Q 50/00; G06Q 20/00
USPC ...................... 705/35–45; 235/380, 382, 384
See application file for complete search history.

(56) References Cited

U.S. PATENT DOCUMENTS

| | | | |
|---|---|---|---|
| 7,527,208 B2 * | 5/2009 | Hammad ............... | G06Q 20/12 235/382 |
| 7,566,003 B2 * | 7/2009 | Silbernagl .......... | G06Q 30/0224 235/375 |
| 7,567,920 B2 * | 7/2009 | Hammad ............... | G06Q 20/32 705/13 |

(Continued)

FOREIGN PATENT DOCUMENTS

WO   WO 2007/090027   8/2007

OTHER PUBLICATIONS

Quibria, Nasreen, "The Contactless Wave: A Case Study in Transit Payments", Jun. 2008, The Federal Reserve Bank of Boston.*

(Continued)

*Primary Examiner* — Resha Desai
*Assistant Examiner* — Joshua D. Bradley
(74) *Attorney, Agent, or Firm* — Otterstedt, Ellenbogen & Kammer, LLP

(57) ABSTRACT

A first request for a transfer of data is transmitted in response to the use of a user device; it is determined that the first request for the transfer of data has been declined; an event is detected that indicates that the transfer of data in response to the use of the user device can be accepted; and a second request for the transfer of data is transmitted in dependence on detecting that the event has occurred.

20 Claims, 3 Drawing Sheets

(56) References Cited

U.S. PATENT DOCUMENTS

| | | | | |
|---|---|---|---|---|
| 7,568,617 | B2* | 8/2009 | Silbernagl | G06Q 20/18 235/375 |
| 7,809,652 | B2* | 10/2010 | Dixon | G06Q 20/027 705/64 |
| 7,828,204 | B2 | 11/2010 | Fiebiger | |
| H2252 | H* | 1/2011 | Bohanan | 705/40 |
| 7,958,050 | B2* | 6/2011 | Finch | G06Q 20/10 705/35 |
| 8,117,129 | B2* | 2/2012 | Saunders | G06Q 20/20 705/21 |
| 8,118,223 | B2* | 2/2012 | Hammad | G06Q 20/045 235/375 |
| 8,281,990 | B2* | 10/2012 | Silbernagl | G06Q 20/04 235/375 |
| 8,346,639 | B2* | 1/2013 | Hammad | G06K 17/00 194/205 |
| 8,346,670 | B2* | 1/2013 | Hasson | G06Q 20/40 235/382 |
| 8,523,069 | B2* | 9/2013 | Hammad | G06Q 20/045 235/375 |
| 8,556,170 | B2 | 10/2013 | Fiebiger | |
| 8,584,936 | B2 | 11/2013 | Fiebiger | |
| 8,630,954 | B2* | 1/2014 | Thaw | G06Q 10/02 705/30 |
| 8,688,554 | B2* | 4/2014 | Hammad | G06Q 20/12 235/380 |
| 8,700,513 | B2* | 4/2014 | Hammad | G06K 17/00 194/205 |
| 8,738,485 | B2* | 5/2014 | Dixon | G06Q 20/20 194/205 |
| 8,763,902 | B2* | 7/2014 | Silbernagl | G06Q 20/04 235/375 |
| 8,881,971 | B2* | 11/2014 | El-Awady | G06Q 20/14 235/375 |
| 8,915,431 | B2* | 12/2014 | Chan | G06Q 20/20 235/382 |
| 8,954,344 | B2* | 2/2015 | Lishak | G06Q 10/00 235/380 |
| 2005/0149455 | A1* | 7/2005 | Bruesewitz | G06Q 20/04 705/64 |
| 2006/0278704 | A1* | 12/2006 | Saunders | G06Q 20/10 235/382 |
| 2008/0116264 | A1* | 5/2008 | Hammad | G06Q 20/045 235/382 |
| 2008/0183565 | A1* | 7/2008 | Dixon | G06Q 20/027 705/13 |
| 2008/0243666 | A1* | 10/2008 | Rowan | G06Q 30/08 705/37 |
| 2009/0012889 | A1* | 1/2009 | Finch | G06Q 20/10 705/35 |
| 2009/0119213 | A1* | 5/2009 | Hammad | G06Q 20/32 705/44 |
| 2009/0171682 | A1* | 7/2009 | Dixon | G06Q 20/20 705/346 |
| 2012/0109820 | A1* | 5/2012 | Galit | G06Q 40/02 705/41 |
| 2012/0221468 | A1* | 8/2012 | Kumnick | G06Q 20/20 705/44 |
| 2012/0259782 | A1* | 10/2012 | Hammad | G06Q 20/12 705/44 |
| 2012/0284187 | A1* | 11/2012 | Hammad | G06Q 20/20 705/44 |
| 2013/0138563 | A1* | 5/2013 | Gilder | G06Q 20/4016 705/44 |
| 2013/0159029 | A1* | 6/2013 | Thaw | G06Q 10/02 705/5 |
| 2013/0191283 | A1* | 7/2013 | Hammad | G06K 17/00 705/44 |
| 2013/0198075 | A1* | 8/2013 | Sakata | G06Q 30/06 705/44 |
| 2013/0275222 | A1* | 10/2013 | Amaro | G06Q 20/102 705/14.58 |
| 2013/0290182 | A1* | 10/2013 | Hill | G06Q 20/04 705/41 |
| 2013/0339247 | A1* | 12/2013 | Lam | G06Q 20/4016 705/44 |
| 2014/0074709 | A1* | 3/2014 | Green | G06Q 40/02 705/44 |
| 2014/0279309 | A1 | 9/2014 | Cowen | |

OTHER PUBLICATIONS

Keitel, Philip, "The Electronification of Transit Fare Payments: Examining the Case for Partnerships Between Payment Firms and Transit Agencies", Apr. 2011, The Federal Reserve Bank of Philadelphia.*

Smart Card Alliance, "Transit and Contactless Financial Payments: New Opportunities for Collaboration and Convergence", Oct. 2006.*

First Data Government and Transit Task Force, "Transit Payment Systems: A Case for Open Payments", May 2010, First Data.*

Ray, Bill, "Londoners Can Bonk their Way to Work without Oyster Cards Today", Dec. 13, 2012, The Register.*

Badger, Emily, "Finally: A Transit Ticket on Your Smart Phone", Jan. 16, 2013, The Atlantic—CityLab.*

Schofield, Jack, "Mobile Phones and Bank Cards to Replace Tickets for Travelling in London", Apr. 3, 2013, ZDNet.*

Tormos, Sebastien, "Turning the Turnstile Mobile: The Big Impact of Mobile Payments on Public Transit", Feb. 12, 2013, Datacard Edge.*

Report Under Section 17(5)(b), United Kingdom Intellectual Property Office, UK Patent Application GB1404907.6, Sep. 18, 2014, pp. 1-5.

Authorized Officer Nathalie Abadie, European Patent Office as ISA, PCT Application No. PCT/GB2015/050606, Apr. 23, 2015 International Search Report and Written Opinion of ISA, pp. 1-9.

* cited by examiner

AUTOMATIC DATA TRANSFER

CROSS REFERENCE TO RELATED APPLICATIONS

This application claims foreign priority to United Kingdom Patent Application 1404907.6, filed 19 Mar. 2014, the complete disclosure of which is expressly incorporated herein by reference in its entirety for all purposes.

FIELD OF THE INVENTION

The present invention relates generally, but not exclusively, to automatic data transfer. According to an embodiment of the invention, a request for a transfer of data is only made when an event has occurred that indicates that the request is likely to be accepted. Applications include the fast updating of a status list of devices that are denied use of a system. In another embodiment, data is automatically transferred between systems in order to update the status lists of each system.

BACKGROUND TO THE INVENTION

The transport systems of many large cities, including London, Paris and Singapore, require users to have a proprietary transit card in order to pay for their journey. It would be a lot more convenient for users of a transport system to not be required to own such transit cards. The transport systems of some transit agencies are therefore being adapted to accept standard bank issued cards, with the payment for a user's journey made as an online transaction. A problem experienced when allowing users to use a bank card to validly enter and exit a transport system is that the time required to perform an on-line transaction with the user's bank card is longer than an acceptable length of time for delaying a user on entry and exit of the transport system.

Known implementations of transport systems that allow users to pay for their journey with bank cards do not therefore typically perform an on-line transaction with the cards on entry and/or exit of the user from the transport system. The transport system only securely authenticates that each user's card is a suitable card for payment and that the card is not on a list of cards that are denied access to the transport system, i.e. a status list. The status list, that may be considered to be a black list, includes details of cards that have balances to be settled and also details of cards that are denied travel for other reasons, such as the card being reported stolen or the user of the card being banned from travel on the transport system.

In order for the journey to be paid for, the transaction is made by the acquirer of the transport system sending a request for payment to the issuer of the bank card of the user. The request is sent either when the user is travelling on the transport system or when the user has already exited the transport system. If the payment request is denied by the issuer, the user is in debt to the transit agency that provides the transport system as they have already consumed travel services. In order ensure that the debt is recovered, the transport system typically adds the details of the bank card of the user to the transport system's status list of cards. The user is therefore prevented from travelling on the transport system until the outstanding balance has been settled.

A problem with the above technique of status listing a user is that the user may not be aware that their card has been added to status list and therefore has a very poor experience when their next attempt to enter the transport system is denied. Moreover, even if a user is aware that their card has been status listed, the user is required to perform the inconvenient process of manually performing a task before being able to travel again.

In order to solve the above problems, automatic debt recovery may be performed. To perform automatic debt recovery, the transport system automatically sends one or more further requests for payment to the issuer of the card (via their acquirer). If one of these requests is approved by the issuer, and payment is therefore made, the transit agency will typically automatically remove the card details of the user from the status list. A user may therefore be both added and removed from the status list without the user manually performing a task, or the user even knowing that their card was entered on the status list. However, a problem experienced by the known automatic debt recovery techniques is that whether or not it will work is highly speculative. The number of allowed requests the technique is typically limited and the acquirer can only guess a time for transmitting each request with no way of knowing whether the request is likely to work. Moreover, automatic debt recovery requests typically may not start until 4 days after a declined authorisation of a transaction and a user may well attempt to travel on the transport system before an automatic debt recovery request has been sent.

In addition, with regard to effective updating of the status list, the mechanism for updating the status list is slow and inherently restricted by the way that the transport system obtains transaction data.

There is therefore a need to improve the automatic transfer of data in general.

SUMMARY OF THE INVENTION

According to a first aspect of the invention, there is provided a computer-implemented method for requesting a transfer of data, the method comprising: transmitting a first request for a transfer of data in response to the use of a user device; determining that the first request for the transfer of data has been declined; detecting an event that indicates that the transfer of data in response to the use of the user device can be accepted; and transmitting a second request for the transfer of data in dependence on detecting that the event has occurred.

Preferably, the method further comprises: generating the first request by a first system; wherein transmitting the first request comprises transmitting, by the first system, the first request to a third system via a second system; the second system is configured to transfer messages and data between the first and third systems; and the third system is configured to provide data that is transferred to the first system in response to the acceptance of the first and/or second request.

Preferably, the event comprises detecting a data transfer into the third system; wherein the data transfer is identified as corresponding to the used user device.

Preferably, the method further comprises transmitting an indication that the event has occurred to the second system and, optionally, the first system.

Preferably, determining that the first request for a transfer of data has been declined comprises detecting, by the second system, a message, transmitted from the third system to the first system, declining a request for the transfer of data.

Preferably, the event comprises the detection of a message, transmitted from the third system to the first system, accepting a further request for data transfer.

Preferably, the method further comprises transmitting, by the second system and/or third system, in response to detecting an event has occurred, a message to the first system indicating that a further request should be made.

Preferably, the method further comprises automatically transmitting the second request, by the first system to the third system, in response to receiving the message indicating that a further request should be made.

Preferably the method further comprises receiving, by the first system, a message indicating that a request for a transfer of data in response to the use of a user device has been declined; transmitting, by the first system to a fourth system, a message indicating that the request for the transfer of data was declined; and adding, by the fourth system, identification information of the user to a list of user devices for having their use denied by the fourth system.

Preferably the method further comprises receiving, by the first system, a message indicating that a request for a transfer of data in response to the use of a user device has been accepted; transmitting, by the first system to a fourth system, a message indicating that the request for the transfer of data was accepted; and removing, by the fourth system, identification information of the use device from the list of user devices for having their use denied by the fourth system.

Preferably, the first system is an acquirer; and the third system is an issuer for the user device.

Preferably, the fourth system is a transport system.

Preferably, the user device is at least one of a standard issue credit card, debit card, prepaid card, commercial card, charge card, mobile telephone, sticker, watch or key fob.

Preferably, the user device is any device capable of making contactless payments.

Preferably, said step of transmitting a second request for the transfer of data is also dependent on a determination that the transfer of data is desired.

Preferably, the method further comprises: determining that said second request for the transfer of data has been declined; and repeating, until a request for the transfer of data has been accepted, the steps of: detecting an event that indicates that the transfer of data in response to the use of the user device can be accepted; and transmitting a request for the transfer of data in dependence on detecting that the event has occurred.

According to a second aspect of the invention, there is provided one or more systems configured to perform the method of any preceding claim.

According to a third aspect of the invention, there is provided a computer-implemented method of updating a list of user devices, the method comprising:

sending, by a first system in response to the use of a user device, a request for a transfer of data to the first system; sending, in response to receiving the request, a message declining the requested transfer of data to the first system; detecting the message declining the requested transfer of data; sending, in response to the detection, a message to a second system that indicates to the second system that the requested transfer of data to the first system was refused; and adding identification data of the user device to a list of user devices that are denied use in the second system.

Preferably, the method of the third aspect further comprises adding, in response to the first system receiving the message declining the transfer of data to the first system, identification data of the user device to a list of user devices that are denied use in the first system.

Preferably the method of the third aspect further comprises: detecting a message sent to the first system, wherein the message accepts a request for transfer of data to the first system; sending, in response to the detection, a message to the second system indicating that a request for a transfer of data to the first system has been accepted; and removing, or changing the status of, the identification data of the user device from the list of user devices to be denied use in the second system in dependence on receiving the message.

Preferably, in the method according to the third aspect, the user device is at least one of a standard issue credit card, debit card, prepaid card, charge card, mobile telephone, sticker, watch, key fob or any device capable of making contactless payments.

According to a fourth aspect of the invention, there is provided a first system, second system, third system and fourth system, wherein: the first system is configured to send, in response to the use of a user device, a request to the fourth system via the third system, wherein the request is for a transfer of data to the first system; the fourth system is configured to send, in response to receiving the request, a message to the first system via the third system, wherein the message declines the requested transfer of data to the first system; the third system is configured to detect the message declining the requested transfer of data and to send, in response to the detection, a message to the second system that indicates to the second system that the requested transfer of data to the first system was refused; and the second system is configured to add identification data of the user device to a list of user devices that are denied use in the second system.

Preferably, in the method according to the fourth aspect, the first system is further configured to add, in response to the first system receiving the message declining the transfer of data to the first system, identification data of the user device to a list of user devices that are denied use in the first system.

Preferably, in the method according to the fourth aspect, the third system is configured to detect a message sent to the first system, wherein the message accepts a request for transfer of data to the first system; the third system is configured to send, in response to the detection, a message to the second system indicating that a request for a transfer of data to the first system has been accepted; and the second system is configured to remove the data identifying the user device from the list of user devices to be denied use in the second system in dependence on receiving the message.

Preferably, in the method according to the fourth aspect, the user device is at least one of a standard issue credit card, debit card, prepaid card, charge card, mobile telephone, sticker, watch, key fob or any device capable of making contactless payments.

BRIEF DESCRIPTION OF DRAWINGS

Embodiments of the present invention will now be described, by way of example only, with reference to the accompanying drawings, in which.

DETAILED DESCRIPTION

A first embodiment of the invention provides an automatic data transfer operation that is performed soon after an event has been detected that indicates that the automatic data transfer is likely to be successful.

The first embodiment is particularly advantageous for the application of automatic debt recovery, such as may be required by a transit agency that provides a transport system that users pay to use with a standard issue bank card. However, embodiments are in no way restricted to automatic debt recovery and are applicable to automatic data transfer in general. Moreover, embodiments are not restricted to applications with transit agencies and are applicable in a wide variety of applications, such as people paying for entry to a venue or stadium.

In addition, a second embodiment provides a technique for improving the speed and accuracy with which the status lists of more than one transit agency are updated.

The first embodiment is described below with reference to automatic debt recovery by a transit agency. Users of a transport system supported by the transit agency pay for their journeys with a standard issue bank card.

Figure 1:
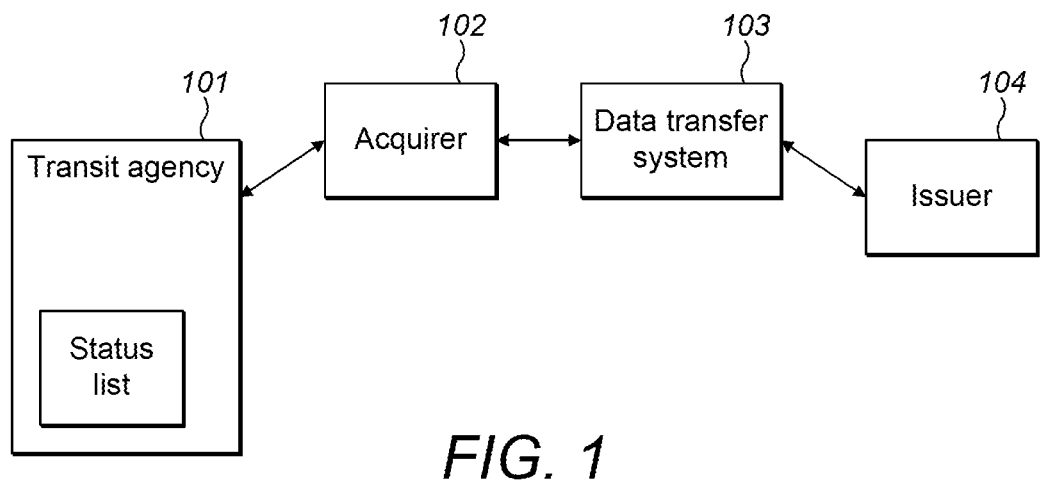
FIG. 1 shows a system according to a first embodiment of the invention.

FIG. 1 shows a system according to a first embodiment. The system comprises a transit agency 101, an acquirer 102 of the transit agency 101, a data transfer system 103 and an issuer 104.

The transit agency 101 provides a transport system, such as a city's train or bus system. The transit agency 101 is shown as comprising a status list. The status list comprises details of bank cards that are denied use of the transport system. The details of the bank cards are stored securely and may be tokenised. The status list may alternatively be provided by a separate system from the transit agency 101.

The acquirer 102 of the transit agency 101 is in communication with the transit agency 101 and the data transfer system 103. The acquirer 102 is responsible for obtaining the payments of users of the transit agency 101 and may be provided by the systems of the bank of the transit agency 101.

The data transfer system 103 is in communication with the acquirer 102 and the issuer 104 of each user's bank card. Although only one issuer 104 is shown, the data transfer system 103 would be in communication with many issuers of bank cards of schemes accepted by the transit agency 101 to pay for journeys. In addition, the data transfer system 103 is also in communication with other acquirers than that of the transit agency 101 and is able to support other types of transaction between an acquirer 102 and an issuer 104, in addition to those from the transit agency 101. The data transfer system 103 transfers messages, payment and any other transaction data between issuer 104 and acquirer 102 systems. The data transfer system 103 may be provided, for example, by a card scheme such as the systems of Master-Card®.

The issuer 104 is in communication with the data transfer system 103. The issuer 104 holds the account of the card that a user has used to attempt to pay for their journey. The issuer 104 may be provided by the systems of a bank.

A user uses their bank card on entry to the transit agency 101. The card details are read and compared with the card details on a status list. A plurality of versions of the status list may exist, with each status list stored locally in each of a respective plurality of card readers, or a single status list may be stored at a central location that is in communication with the plurality of card readers. If the card details are not on the status list, and the card is determined to be suitable for paying for the card user's journey, then the user's card is accepted and the user is allowed to use the transit agency 101. Due to the time required to perform an on-line transaction being longer than would be acceptable to delay the passage of a user on entry to the transit agency 101, which will especially by the case if real time communication with the issuer 104 of the bank card is unavailable, the user is allowed to travel on the transport system 101 prior to an on-line transaction for obtaining payment for their journey has been completed.

The transit agency 101 may only require users to present a bank card at the start of their journey and generate a transaction based on the read card data on entry to the transit agency 101 alone. Alternatively, the transit agency 101 may also require users to present their bank card on exit from the transit agency 101 and then generate a transaction in dependence on the read card data when a user exits the transit agency 101.

The card details of the user are transmitted to the acquirer 102 with payment for the user's journey. In addition to the card details, other transaction data or payment data may be transmitted to the acquirer 102. The acquirer 102 receives the card details and sends a transaction request for the payment to the issuer 104 of the card.

If the request is accepted, a response message approving the transaction is sent from the issuer 104 to the acquirer 102 and the payment for the user's journey is made.

If the transaction request is refused, as would be the case if the user had insufficient funds to pay for their journey in their bank account, a response message is sent from the issuer 104 to the acquirer 102 informing the acquirer 102 that the transaction request has been declined.

After receiving a message that a transaction has been declined, the acquirer 102 sends a message to the transit agency 101 informing the transit agency 101 that it was not possible to pay for a user's journey with the user's card. The transit agency 101 then adds the user's card details to a status list of cards prevented from using the transit agency 101.

Once a user is blocked from travel, they are required to remedy the situation both with their issuer 104 and the transit agency 101. There are a number of ways that this may happen. A non exhaustive list is below:

User Initiated via a web site—in this instance the transit agency 101 provides a web site allowing the user to view their debt, and make attempts to pay it and re-start travel User Initiated via a call centre—in this instance the transit agency 101 provides a telephone call centre allowing the user to hear their debt, and make attempts to pay it and re-start travel User Initiated via a ticket vending machine—in this instance the transit agency 101 provides an automated ticket vending machine allowing the user to view their debt, and make attempts to pay it and re-start travel User Initiated via a ticket office/kiosk—in this instance the transit agency 101 provides a manned ticket office or booth, allowing the user to view their debt, and make attempts to pay it and re-start travel User Initiated via a tap on a reader—in this instance the transit agency 101 detects that the cardholder wishes to travel, and whilst they are denied entry as their details are on the status list, the transit agency 101 may take this as a sign that the user wishes to travel, and as such initiates an attempt to recover the money owed and allow the user to re-start travel In addition to these, a transit agency 101 may attempt debt recovery transactions automatically. Typically this may involve multiple attempts during an agreed time period, and may not start until a few days after the debt was incurred.

All of these mechanisms have problems—either they require the user to perform a set of actions (which may be complex, or hard to understand, particularly for overseas visitors to a city), or the transit agency 101 is attempting to recover the debt in a purely speculative basis, and potentially incurring transactional fees from their acquirer 102.

Embodiments improve on known techniques by the issuer 104 automatically performing a debt recovery operation, at time that has a likely chance of success, so that a user's card details are automatically, and quickly, removed from the status list.

The inventors have realised that a common reason for a user's account having insufficient funds to pay for a journey is due to account funds running low in the days prior to the user being paid their salary, typically at the end of a month. The user can therefore be expected to have sufficient funds to pay for their journey in the near future, when their salary is paid into their account.

According to the first embodiment, an event is monitored for that indicates that a user has sufficient funds in their account to make a payment that was previously declined. In response to detecting such an event, an automatic debt recovery operation is preformed which, since the event has occurred, can be expected to succeed. A user's card can therefore be automatically and quickly removed from a status list in response to the payment.

In a first implementation of the first embodiment, the data transfer system 103 monitors messages transmitted from the issuer 104 to the acquirer 102 via the data transfer system 103. When the data transfer system 103 detects that a message declining a transaction request is transmitted by the issuer 104, the data transfer system 103 both transmits the message to the acquirer 102 and also logs that a transaction request by the acquirer 102 was declined. The data transfer system 103 therefore generates a log, or list, of card details such as Primary Account Numbers (the number embossed or printed on a payment card, also referred to as a PAN), and/or any other identification data, of cards that have had a transaction request declined.

The data transfer system 103 monitors all of the transaction request messages that are transmitted over the data transfer system 103 between acquirers and issuers. If the data transfer system 103 detects one or more transaction requests comprising card details of a card that is in the log, the data transfer system 103 monitors the response to the request sent from the issuer 104 of the card. If the response approves a requested transaction, this is detected as an event that indicates that a user's account is once more in good standing and that it is likely that the user has sufficient funds in their account to make a payment that was previously declined.

An approved transaction may result due to the user using their card to make any type of purchase. Since the transaction was successful, it is reasonable to assume that the account of the user has had funds transferred into it, for example due to the user receiving their salary payment, hence this is detected as an event.

Alternatively, a user may have a salary payment, or other source of income (including for example a transfer from another bank account from the same individual (e.g. a savings account), or including a transfer from another individual), transferred into their account as a load to their card. The data transfer system 103 monitors for such a data transfer for card details that are in the log and detects this as an event that indicates that a user has sufficient funds in their account to make a payment that was previously denied.

After detecting any of the above-described events, the data transfer system 103 sends a message to the acquirer 102 of the transit agency 101 informing the acquirer 102 that it may be an appropriate time for performing an automatic debt recovery process. In response to receiving this message, the acquirer 102 automatically sends one or more transaction requests to the issuer 104 for recovering the payment of the user's journey. If one of these transaction requests is approved, the acquirer 102 automatically sends a message to the transit agency 101 informing the transit agency 101 that the user can be removed from the status list.

In an alternative to the present embodiment, the acquirer 102 sends the determination that the user's account is once more in good standing to the transit agency 101, and the transit agency then determines whether or not it wishes to attempt to recover the debt. The acquirer 102 only sends one or more transaction requests to the issuer 104 for recovering the payment on receipt of an instruction to do so from the transit agency 101.

A second implementation of the first embodiment is similar to the first implementation except that the issuer 104 that declined a transaction request from the acquirer 102 of the transit agency 101 maintains such a log comprising details of cards that have had a transaction request refused. The issuer 104 then monitors the account of each card in the log and detects events that indicate that a user has sufficient funds in their account to make a payment that was previously denied due to lack of funds. For example, the issuer 104 detects as events a salary payment, or any other payment of funds, into the corresponding account of a card with its details in the log. After detecting such an event, the issuer 104 sends a message to the data transfer system 103 who in turn sends the message to the acquirer 102 of the transit agency 101 informing the acquirer 102 that it is an appropriate time for performing an automatic debt recovery process and the process proceeds as already described for the first implementation.

Advantageously, the second implementation can result in the acquirer 102 being informed that it is an appropriate time to perform debt recovery faster than the first implementation as it is not necessary to wait for a user to perform a successful transaction, or for a user to receive a payment as a load to their card, in order for an event to be detected.

A third implementation is a combination of both of the above-described first and second implementations. Both the issuer 104 and the data transfer system 103 are able to detect an event and send a message to the acquirer 102 of the transit agency 101 informing the acquirer 102 and the transit agency 101 that it is an appropriate time for attempting an automatic debt recovery process.

Advantageously, embodiments quickly and automatically remove a user from a status list without the requirement of the user having to perform any steps. Furthermore the embodiments provide a higher degree of certainty and are less speculative than existing automatic debt recovery techniques. By waiting for an event that indicates that a user has sufficient funds in their account, the automatic debt recovery process is performed with a high likelihood of success. Moreover, the automatic debt recovery is initiated when the data transfer system 103 and/or issuer 104 informs the acquirer 102 that it is an appropriate time to perform the process. When such a data transfer system 103 and/or issuer 104 initiated automatic debt recovery process is performed, the acquirer 102 is not restricted by the operational constraints of acquirers that act autonomously when they perform an automatic debt recovery process and are not provided with an indication that it is an appropriate time to perform an automatic debt recovery process.

Figure 2:
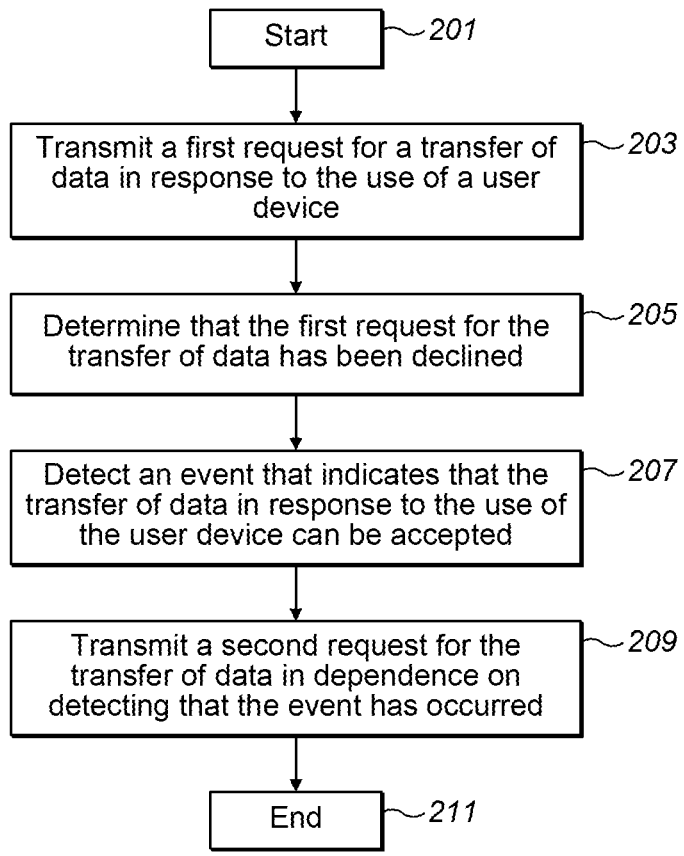
FIG. 2 is a flowchart of the first embodiment of the invention.

A flowchart of a computer-implemented process according to the first embodiment is shown in FIG. 2.

In step 201, the process begins.

In step 203, a first request is transmitted for a transfer of data in response to the use of a user device. This may be initiated by a user tapping their card in a transit agency 101, thus indicating that they wish to travel.

In step 205, the process determines that the first request for the transfer of data has been declined.

In step 207, the process detects an event that indicates that the transfer of data in response to the use of the user device can be accepted.

In step 209, the process transmits a second request in order to recover the debt for the transfer of data in dependence on detecting that the event has occurred. If this is also declined, the process may repeat steps 207 and 209 until the second request is accepted.

In step 211, the process ends.

A second embodiment is described below that improves how quickly status lists are updated and thereby their accuracy.

According to the second embodiment, a data transfer system 103, that may be the data transfer system 103 as shown and described with reference to FIG. 1, is used to update a plurality of status lists of a respective plurality of systems. For example, the data transfer system 103 updates the status lists of the transit agency 101, as shown in FIG. 1, as well as status lists of other transit agencies, or any other systems that have their own status lists. The data transfer system 103 may be provided by, for example, a MasterCard® system.

The second embodiment is described below with reference to the data transfer system 103 updating a plurality of status lists of a respective plurality of transit agencies. However, this is purely exemplary and the status lists may be of any type of system.

Figure 3:
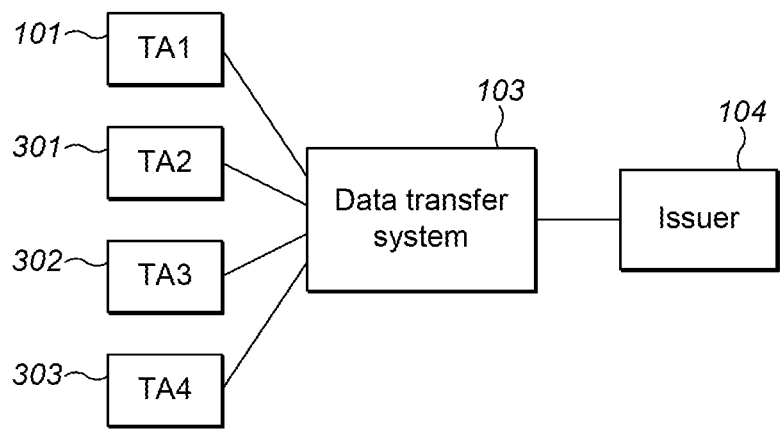
FIG. 3 shows a system according to a second embodiment of the invention.

FIG. 3 shows a data transfer system 103, and a plurality of further systems, according to the second embodiment.

TA1, TA2, TA3 and TA4 are all transit agencies and each transit agency may be the transit agency 101 as described for the first embodiment. The transit agencies 101, 301, 302 and 303 may provide different modes of transport, such as train or tram, and/or operate over different regions. Although four transit agencies are shown in FIG. 3, any number of transit agencies may be supported. Each of the transit agencies TA1, TA2, TA3 and TA4 comprises an acquirer 102 and transport system as described for the first embodiment. Further, each of the transit agencies TA1, TA2, TA3 and TA4 may employ the services of the same acquirer 102, or may use a different acquirer, or some may use one acquirer and some may use another. All of the acquirers are connected to the data transfer system 103.

Each transit agency is in communication with the data transfer system 103 via their respective acquirer. The data transfer system 103 is also in communication with one or more or all of the issuers that support transactions by the cards of users of each transit agency.

Each transit agency maintains its own version of a status list comprising details of cards denied from using the transit agency. Each status list may be as described for the first embodiment. The stored data within each status list may be any card details, such as a primary account number, PAN, that may be stored in a tokenised form and may also include card details such as the expiry date and card sequence number within such a token.

As described for the first embodiment, a transit agency TA1 sends a payment request to an issuer 104 via their acquirer and the data transfer system 103. The issuer 104 sends a message back to TA1, via the data transfer system 103 and the relevant acquirer, informing TA1 that the requested payment is declined. TA1 then adds the card to a status list of TA1.

According to the second embodiment, the data transfer system 103 detects the message declining the payment that is sent from the issuer 104 and automatically sends a message to TA2, TA3 and TA4 that informs these other transit agencies that a payment request made with the card was declined. In response to receiving the message from the data transfer system 103, TA2, TA3 and TA4 may then decide to add the card to their status lists as well. A user's card may therefore be added to a status list of a transit agency even though the user has not failed to pay for a journey with that specific transit agency. Advantageously, each transit agency is able to quickly update their status list to prevent a user who is unable to pay for their journey from travelling.

The data transfer system 103 also generates a log comprising details of cards that have had a transaction refused. The data transfer system 103 then monitors messages sent over the data transfer system 103. If the data transfer system 103 detects a message from an issuer 104 that is an approval of a payment for one of the logged cards, the data transfer system 103 then sends a message to all of the transit agencies that informs them that that a transaction has been approved for the card. In response to receiving the message, each of the transit agencies may then remove the card from their status list. Advantageously, a user's card may be automatically removed from all of the status lists.

In an alternative implementation, before a card is removed from a status list, a transit agency may also determine if there is any payment due to them from the issuer 104 of the card. Only transit agencies for which there is no payment due would then automatically remove the card details from their status list whereas transit agencies that still require payment would maintain the card on their status list. Each transit agency may also perform an automatic debt recovery operation, if required, in response to receiving the message.

Advantageously, status lists of a plurality of separate systems are quickly and automatically updated.

Figure 4:
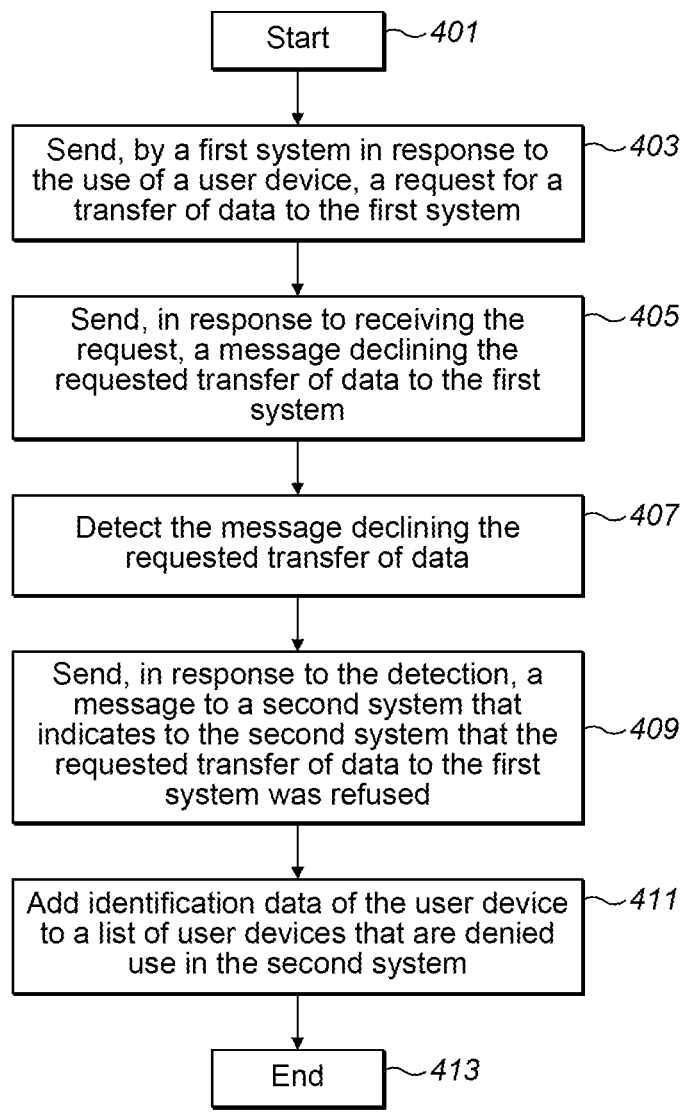
FIG. 4 is a flowchart of the second embodiment of the invention.

A flowchart of a computer-implemented process according to the second embodiment is shown in FIG. 4.

In step 401, the process begins.

In step 403, the process sends, by a first system 101 in response to the use of a user device, a request for a transfer of data to the first system 101. This may be initiated by a user tapping their card in a transit agency 101, thus indicating that they wish to travel.

In step 405, the process sends, in response to receiving the request, a message declining the requested transfer of data to the first system 101.

In step 407, the process detects the message declining the requested transfer of data.

In step 409, the process sends, in response to the detection, a message to a second system 301, 302, 303 that indicates to the second system 301, 302, 303 that the requested transfer of data to the first system 101 was refused.

In step 411, the process adds identification data of the user device to a list of user devices that are denied use in the second system 301, 302, 303.

In step 413, the process ends.

Many modifications and variations can be made to the above described embodiments without departing from the scope of the invention.

For example, the second embodiment has been described with messages being sent to and from transit agencies. The skilled person would understand that the payment request messages and response messages would be sent and received by an acquirer of each the transit agencies. The acquirer of each transit agency may be provided within the transit agency, as shown in Figure 3. Alternatively, each acquirer may be provided separately from the transit agency, as shown in FIG. 1.

In both the first and second embodiments, the messages communicated through the data transfer system 103 may be standard Authorisation Request, Approve Response and Decline Response messages as known in data transfer systems.

In the above-described embodiments, one or more status lists of respective systems are maintained. Each system may also have a white list that comprises details of cards that are never to be denied use by the system. In addition, when a payment is received corresponding to details of a card on the status list, so that the card is prevented from being used by a transit agency, the details of the card may only have their status changed to allow the card to be used by the transit agency rather than actually removing the card details from the list.

Throughout the above-described embodiments, users are described as making payments using cards. The card may be any standard issue bank card, such as a credit card, debit card, prepaid card, commercial card or charge card. Embodiments are not restricted to the use of cards and more generally include the use of any user device that can pay for the use of a system. The user device may be, for example, a mobile telephone, sticker, watch, key fob or any other non-card form factor that is capable of making a contactless payment.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A computer-implemented method performed at least in part by a payment transfer system communicatively coupled between an acquirer system and an issuer system, the method comprising:
   the payment transfer system receiving, from the acquirer system, a request for a fare to be paid to a transit agency client of the acquirer system from a financial account, maintained by the issuer system, responsive to the transit agency client providing access to a transport system by a user of the financial account maintained by the issuer system;
   the payment transfer system transmitting, to the issuer system, the request for the fare to be paid from the financial account;
   the payment transfer system receiving, from the issuer system, a response to the request indicating either that the fare was paid or that the fare could not be paid from the financial account;
   after the response indicates that the fare could not be paid from the financial account, monitoring the financial account for an activity suggesting that the fare can be paid from the financial account;
   responsive to the activity suggesting that the fare can be paid from the financial account, the payment transfer system automatically retransmitting, to the issuer system, the request for the fare to be paid from the financial account;
   wherein the request for the fare to be paid from the financial account is retransmitted after the response to the request indicating that the fare could not be paid from the financial account;
   wherein the transit agency client provides the access to the user responsive to presentation of a bank card by the user to the transit agency client, the bank card being associated with the financial account maintained by the issuer system rather than with the transit agency client; and
   wherein the transit agency client provides the access to the user before receipt of the response.

2. The method of claim 1, wherein the payment transfer system monitors the financial account for the activity suggesting that the fare can be paid from the financial account.

3. The method of claim 2, wherein the payment transfer system retransmitting the request to the issuer system responsive to the activity suggesting that the fare can be paid from the financial account comprises:
   the payment transfer system transmitting, to the acquirer system, a notification of the activity suggesting that the fare can be paid from the financial account;
   responsive to the notification, the payment transfer system receiving, from the acquirer system, an instruction to retransmit the request to the issuer system; and
   responsive to the instruction, the payment transfer system retransmitting, to the issuer system, the request for the fare to be paid from the financial account.

4. The method of claim 1, wherein the issuer system monitors the financial account for the activity suggesting that the fare can be paid from the financial account, and wherein the payment transfer system retransmitting the request to the issuer system responsive to the activity suggesting that the fare can be paid from the financial account comprises:
   the payment transfer system receiving, from the issuer system, a notification of the activity suggesting that the fare can be paid from the financial account;
   the payment transfer system transmitting, to the acquirer system, the notification of the activity suggesting that the fare can be paid from the financial account;
   responsive to the notification, the payment transfer system receiving, from the acquirer system, an instruction to retransmit the request to the issuer system; and
   responsive to the instruction, the payment transfer system retransmitting, to the issuer system, the request for the fare to be paid from the financial account.

5. The method of claim 1, wherein the payment transfer system does not retransmit the request for the fare from the financial account before the event suggesting the fare can be paid from the financial account.

6. The method of claim 1, further comprising the payment transfer system repeatedly retransmitting the request for the fare to be paid until the response indicates that the fare was paid from the financial account.

7. The method of claim 6, wherein the payment transfer system retransmits the request for the fare to be paid responsive to each activity suggesting that the fare can be paid from the financial account.

8. The method of claim 1, wherein the activity suggesting that the fare can be paid from the financial account comprises a payment from the financial account.

9. The method of claim 1, wherein the activity suggesting that the fare can be paid from the financial account comprises a payment into the financial account.

10. The method of claim 1, wherein the transit agency client provides the access to the user before the payment transfer system receives, from the acquirer system, the request for the fare to be paid.

11. The method of claim 1, wherein the transit agency client provides the a access to the user responsive to presentation of the bank card unless at least one of the bank card and the user are on a status list.

12. The method of claim 11, further comprising adding the at least one of the bank card and the user to the status list when the response indicates that the fare could not be paid from the financial account.

13. The method of claim 12, further comprising removing the at least one of the bank card and the user from the status list when the response indicates that the fare was paid from the financial account.

14. The method of claim 1, wherein the payment transfer system retransmitting the request to the issuer system responsive to the activity suggesting that the fare can be paid from the financial account comprises:
the payment transfer system transmitting, to the acquirer system, a notification of the activity suggesting that the fare can be paid from the financial account;
the acquirer system transmitting, to the transit agency client, the notification from the payment transfer system;
responsive to the notification, the acquirer system receiving, from the transit agency client, an instruction to retransmit the request to the issuer system;
the acquirer system transmitting, to the payment transfer system, the instruction from the transit agency client; and
responsive to the instruction, the payment transfer system retransmitting, to the issuer system, the request for the fare to be paid from the financial account.

15. A payment transfer system comprising a computer configured to:
receive, from an acquirer system, a request for a fare to be paid to a transit agency client of the acquirer system from a financial account, maintained by an issuer system, responsive to the transit agency client providing access to a transport system by a user of the financial account;
transmit, to the issuer system, the request for the fare to be paid from the financial account;
receive, from the issuer system, a response to the request indicating either that the fare was paid or that the fare could not be paid from the financial account;
after the response indicates that the fare could not be paid from the financial account, monitor the financial account for an activity suggesting that the fare can be paid from the financial account;
responsive to the activity suggesting that the fare can be paid from the financial account, automatically retransmit, to the issuer system, the request for the fare to be paid from the financial account;
wherein the request for the fare to be paid from the financial account is retransmitted after the response to the request indicating that the fare could not be paid from the financial account;
wherein the transit agency client provides the access to the user responsive to presentation of a bank card by the user to the transit agency client, the bank card being associated with the financial account maintained by the issuer system rather than with the transit agency client; and
wherein the transit agency client provides the access to the user before receipt of the response.

16. A computer-implemented method performed at least in part by a payment transfer system communicatively coupled between an acquirer system and an issuer system, the method comprising the steps of:
the payment transfer system receiving from the acquirer system a request for a first transit agency to be paid for granting a user access to a transport system responsive to presentation of a bank card by the user to the first transit agency;
the payment transfer system transmitting the request from the acquirer system to the issuer system;
the payment transfer system receiving a reply from the issuer system indicating that the first transit agency will not be paid responsive to the request;
the payment transfer system transmitting the reply to the acquirer system for the first transit agency; and
responsive to the issuer system indicating that the first transit agency will not be paid responsive to the request, the payment transfer system instructing a second transit agency to add the bank card to a status list maintained by the second transit agency such that the second transit agency will deny access to the user responsive to presentation of the bank card by the user to the second transit agency;
wherein the first transit agency grants access to the user before receipt of the reply from the issuer system; and
wherein the bank card is associated with a financial account maintained by the issuer system rather than with the first or second transit agencies.

17. The method of claim 16, wherein each one of a plurality of entities, comprising the first transit agency and the second transit agency, maintains a respective status list such that a given one of the plurality of entities provides service to a user responsive to presentation of a bank card unless the bank card is on the respective status list maintained by the given one of the plurality of entities.

18. The method of claim 17 further comprising, responsive to the issuer system indicating that the first transit agency will not be paid responsive to the request, adding the bank card to the respective status lists maintained by each of the plurality of entities.

19. The method of claim 16, wherein if the user pays the first transit agency, the second transit agency removes the at least one of the bank card and the user from the status list of second transit agency such that the second entity transit agency will grant access to the user responsive to presentation of the bank card by the user to the second transit agency.

20. A payment transfer system comprising a computer configured to:
receive from an acquirer system a request for a first transit agency to be paid for granting a user access to a transport system responsive to presentation of a bank card by the user to the first transit agency;
transmit the request from the acquirer system to an issuer system;

receive a reply from the issuer system indicating that the first transit agency will not be paid responsive to the request;
transmit the reply to the acquirer system for the first transit agency; and
responsive to the issuer system indicating that the first transit agency will not be paid responsive to the request, instruct a second transit agency to add the bank card to a status list maintained by the second transit agency such that the second transit agency will deny access to the user responsive to presentation of the bank card by the user to the second transit agency;
wherein the first transit agency grants access to the user before receipt of the reply from the issuer system; and
wherein the bank card is associated with a financial account maintained by the issuer system rather than with the first or second transit agencies.

* * * * *